3,192,186
CHAIN EXTENDED POLYETHER PREPOLYMER POLYURETHANE CASTINGS
Erwin Müller and Karl-Ludwig Schmidt, Leverkusen, and Heinz Schultheis, Cologne-Stammheim, Germany, assignors to Farbenfabriken Bayer Aktiengesellschaft, Leverkusen, Germany, a corporation of Germany
No Drawing. Filed Apr. 6, 1960, Ser. No. 20,240
Claims priority, application Germany, Apr. 10, 1959, F 28,170
8 Claims. (Cl. 260—77.5)

This invention relates to polyurethane castings and to a method of making the same. More particularly it relates to polyurethane castings having superior properties than those heretofore known.

It is known to produce elastomeric polyurethane plastics by reacting linear polyhydroxyl compounds having a molecular weight greater than 1,000 with an excess of an organic diisocyanate and curing the reaction product in a mold after adding a cross-linking agent. The second step of the procedure may be accomplished by either adding the cross-linking agent to the reaction product and pouring the resulting mixture into a mold where curing is effected with the addition of heat or by conducting the reaction in a kneader until a friable material is obtained and then curing by pressing into heated molds.

It is known that products having different mechanical properties result depending upon the quantities of isocyanate and cross-linking agents used. When larger quantities of isocyanate and cross-linking agent are used, the hardness and the modulus of products are increased while the elasticity decreases. This decrease in elasticity as the degree of cross-linking increases is undesirable. The decrease in elasticity is especially predominant when polyhydric polyethers are used as the polyhydroxy compound and even more drastically, when polypropylene glycol ether is used. The low elasticity of the products prepared with polyhydric polyethers results in high damping under dynamic stress. This property in combination with the low resistance to tearing of the products considerably restrict the utility of the materials.

It is, therefore, an object of this invention to provide polyurethane plastics which are not subject to the disadvantage of the prior art. It is another object of this invention to produce polyurethane castings having a high elasticity. It is still another object of this invention to provide an improved method of preparing polyurethane plastics. It is another object of this invention to provide an improved method of making polyurethane plastics having a high modulus combined with a high elasticity. A further object of this invention is to provide an improved method of preparing polyurethane castings having a high modulus, a high elasticity, a high hardness factor and a high resistance to tearing. It is a still further object to provide a method of preparing polyurethane plastics having an increased resistance to saponification.

The foregoing objects and others which will become apparent from the following description are accomplished in accordance with the invention, generally speaking, by providing polyurethane elastomers obtained by a casting process which comprises reacting a polyhydric polyalkylene ether having a molecular weight greater than 750 with an excess of an organic diisocyanate, reacting this product in a subsequent reaction with an excess of a glycol having two primary hydroxyl groups and a molecular weight less than 500, the excess being calculated on the free —NCO groups available to prepare an hydroxyl terminated polyether-polyurethane compound and curing to an elastic product by the further reaction with an organic polyisocyanate and a chain extending agent. More particularly this invention contemplates the reaction of an hydroxyl terminated polyether-polyurethane prepared by reacting a polyhydric polyalkylene ether with an excess of an organic diisocyanate in the first step and reacting the product of the first step with an excess of a glycol having two primary hydroxyl groups in a second step and subsequently curing to an elastomeric product by reaction with an excess of an organic polyisocyanate and a chain extending agent.

Any suitable polyhydric polyalkylene ether having a molecular weight greater than 750 and an hydroxyl number of from about 40 to about 150 may be used in the process of this invention to prepare the hydroxyl terminated polyether-polyurethane such as, for example, the polymers derived from alkylene oxides such as, for example, ethylene oxide, propylene oxide, butylene oxide and the like. The polyhydric polyalkylene ether may also be prepared by the polymerization of the cyclic ethers such as, for example, dioxane, tetrahydrofuran and the like. The polyhydric polyalkylene ethers may also be prepared by the condensation of an alkylene oxide with a glycol such as, for example, ethylene glycol, propylene glycol, butylene glycol, and the like. Any known process for preparing the polyhydric polyalkylene ethers may be used such as, for example, the process described by Wurtz in 1859 and in the "Encyclopedia of Chemical Technology," volume 7, pages 257 to 262, published by Interscience Publishers in 1951, or in U.S. Patent 1,922,459. It is, of course, also possible to provide mixed ethers of the aforesaid alkylene oxides. The polyhydric polyalkylene ethers having a propylene oxide base are preferred.

The hydroxyl terminated polyether-polyurethane is prepared by reacting a polyhydric polyalkylene ether having a molecular weight greater than 750 with an excess of an organic diisocyanate, the excess preferably being in a molar ratio of polyhydric polyalkylene ether to organic diisocyanate of from about 1:1.5 to about 1:2. This reaction is preferably carried out at elevated temperatures of from about 80° C. to about 150° C. until all of the hydroxyl groups of the polyether have disappeared.

This isocyanate terminated polyether-polyurethane is then further modified by reacting with a glycol having two primary hydroxyl groups and a molecular weight less than about 500. The glycol is utilized in a quantity in excess of that necessary to react with all —NCO groups and preferably in a ratio of from about 1.8 to about 2 equivalents per each free NCO group. This reaction also takes place at elevated temperatures and preferably within the same range as that set forth above until —NCO groups are no longer present. The resulting hydroxyl terminated polyether-polyurethane has a molecular weight greater than 1,000 and an hydroxyl number of from about 35 to about 120.

Any suitable glycol having two primary hydroxyl groups may be used as such, for example, ethylene glycol, propylene glycol, 1,4-butylene glycol, 1,5-amylene glycol, diethylene glycol, triethylene glycol and higher polyethylene glycols, 1,6-hexanediol, thiodiethylene glycol, 2,2-dimethyl-1,3-propanediol, xylylene glycol and the like.

The hydroxyl terminated polyether-polyurethane compounds are for the major part viscous oils which are reacted at elevated temperatures of from about 80° to about 150° with a quantity of an organic diisocyanate of from about 20 to about 300 mol percent in excess of the quantity required for reaction with the terminal hydroxyl groups.

A chain extending agent containing active hydrogen containing groups in the molecule as determined by the Zerewitinoff method, which are reactive with isocyanate groups, is then introduced into the reaction product of the isocyanate and the hydroxyl terminated polyether-polyurethane and the resulting mixture is cast into prepared molds maintained at a temperature of from about 80° to about 140° where the final curing of the chain extending reaction product takes place. The cross-linking agent is added preferably in a quantity such as the excess of —NCO groups does not entirely disappear. Thus the chain extending agent is used in less than the stoichiometric ratio and preferably in such an amount that from about 0.3% to about 1% NCO groups are present in the casting mixture.

Any suitable organic diisocyanate may be used in the preparation of the hydroxyl terminated polyether-polyurethane and in the reaction with the hydroxyl terminated polyether-polyurethane to produce the final product such as, for example, aliphatic diisocyanates, aromatic diisocyanates, alicyclic diisocyanates, and heterocyclic diisocyanates including such as, for example, ethylene diisocyanate, ethylidene diisocyanate, propylene diisocyanate, butylene diisocyanate, cyclopentylene-1,3-diisocyanate, cyclohexylene-1,4-diisocyanate, cyclohexylene-1,2-diisocyanate, 2,4-toluylene diisocyanate, 2,6-toluylene diisocyanate, 4,4'-diphenylmethane diisocyanate, 2,2-diphenyl propane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene - 4,4' - diisocyanate, diphenylsulfone-4,4'-diisocyanate, dichlorohexamethylene diisocyanate, tetramethylene diisocyanate, pentamethylene diisocyanate, hexamethylene diisocyanate, 1-chlorobenzene-2,4-diisocyanate, furfurylidene diisocyanate and the like. It is preferred, however, however, that in the preparation of the hydroxyl terminated polyether-polyurethane that either 2,4-toluylene diisocyanate, hexamethylene diisocyanate or diphenylmethane-4,4'-diisocyanate be used with 2,4-toluylene diisocyanate being the most preferred. In the reaction of the hydroxyl terminated polyether-polyurethane with an excess of an organic diisocyanate, any of the above isocyanates may be used, however, it is preferred that an aromatic diisocyanate be used and preferably 1,5-naphthylene diisocyanate, p-phenylene diisocyanate, or 4,4'-diphenylmethane diisocyanate.

Any suitable chain extending agent may be used such as, for example, ethylene glycol, quinite, 1,4-butanediol, 1,6-hexanediol, 1,5-naphthylene-di - β - dihydroxyethyl ether, hydroquinone-β-dihydroxyethyl ester, trimethylol propane, glycerine, hexanetriol, water, butylene diamine, 3,3'-dichlorobenzidine, 3,3' - dichloro-4,4' - diamino diphenylmethane, 2,5-dichlorophenylene-1,4-diamine, amino-ethyl alcohol, 3-amino-chlorohexanol, p-amino-phenylethyl alcohol and the like.

Of course, the reaction can be carried out in an acidic or in an alkaline environment which retards or accelerates the reactivity of an isocyanate respectively. As retarding agents, acids such as, for example, hydrochloric acid, acid chlorides such as benzoyl chloride, sulphur dioxide, boric acid esters, acid fillers and the like may be used. To establish an alkaline environment, an accelerator such as, for example, tertiary amines such as, for example, N-methyl morpholine, dimethyl benzylamine, methyl diethyl amine and diethanol amine, basic fillers, organo-metallic compounds such as, for example, iron-acetyl-acetonate, dibutyl tin dilaurate and the like may be used.

The plastics obtained by the process of this invention exhibit a high modulus and high elasticity in addition to a high hardness factor. The products are also highly resistant to tearing and, therefore, differ quite substantially from the prior known cross-linked plastics obtained by reacting polyethers with isocyanates. The products of this invention are also superior to elastomers prepared from polyesters and diisocyanates such as, those produced in the manner taught in German patent specification No. 831,772 as the elastomers made in accordance with the invention exhibit an increased resistance to saponification.

By virtue of the superior properties and especially the combination of a high modulus with a high elasticity, the elastomeric products of this invention are suitable for example, as plates, pipes, cylinders, annular linings for ball mills, resilient machine components, foot mats, shoe heels, buffers, packings and handles of all types.

The invention is further illustrated by the following examples in which parts are given by weight unless otherwise specified.

Example 1

About 1 kg. of polypropylene glycol ether having an hydroxyl number of 50 is dehydrated at 130° C. and 12 mm. At the same temperature, about 156 g. of 2,4-toluylene diisocyanate are incorporated by stirring. The mixture is kept for about 1 hour at from about 130 to about 140° C. After cooling to about 90° C., about 134 g. of triethylene glycol are incorporated all at once while stirring and thereafter the mixture is heated for another hour at from about 130 to about 150° C. The resulting modified polyhydroxyl compound containing hydroxyl groups is a viscous light yellow oil having an hydroxyl number of 42.

About 60 g. of 1,5-naphthylene diisocyanate are incorporated into about 200 g. of this polyhydroxy compound at from about 130 to about 140° C. Condensation is carried out for about 20 minutes at this temperature, thereafter about 16.8 g. of 1,4-butanediol are incorporated by stirring and the melt is poured into prepared molds. By heating for another 24 hours at about 100° C., a cross-linked elastic material is obtained which has the following properties:

| | | |
|---|---|---|
| Strength | kg./cm.$^2$ | 194 |
| Elongation | percent | 390 |
| Permanent elongation | do | 36 |
| Resistance to further tearing (Graves) | kg./cm. | 61 |
| Shore hardness | degrees | 95 |
| Elasticity | percent | 40 |
| Tension range at 300% elongation | kg./cm. | 160 |

Example 2

Under the conditions indicated in Example 1, the hydroxy terminated polyether-polyurethane is prepared by reacting about 1 kg. of polypropylene glycol ether having an hydroxyl number of 50, 156 g. of 2,4-toluylene diisocyanate and 60 g. of ethylene glycol. The polyhydroxy compound which is formed has an hydroxyl number of 54.

About 60 g. of 1,5-naphthylene diisocyanate are incorporated by stirring into about 200 g. of this polyhydroxy compound at about 130 to about 140° C. The mixture is condensed for about 20 minutes at this temperature. Thereafter about 14.6 g. of 1,4-butanediol are incorporated and the melt is poured into prepared molds. After being heated for another 24 hours at 100° C., a cross-linked elastic plastic which has the following properties is obtained:

| | | |
|---|---|---|
| Strength | kg./cm.$^2$ | 217 |
| Elongation | percent | 425 |
| Permanent elongation | do | 28 |
| Resistance to further tearing | kg./cm. | 60 |
| Shore hardness | degree | 91 |
| Elasticity | percent | 37 |
| Tension range at 300% elongation | kg./cm. | 168 |

It is, of course, to be understood that the invention is not to be limited by the examples set forth, but that any of the components set forth above may be utilized in place of those used in the examples. For example, any of the organic diisocyanates may be utilized in place of those used in the examples. Also any of the chain extending agents may be used in the examples.

Although the invention has been described in considerable detail for the purpose of illustration, it is to be understood that variations may be made therein by those skilled

What is claimed is:

1. A method of making a liquid polyurethane casting composition which comprises reacting a polyalkylene ether glycol, the alkylene portion of which contains from two to four carbon atoms, said polyalkylene ether glycol having a molecular weight of at least about 750 and a hydroxyl number of from about 40 to about 150 with an organic diisocyanate, the molar ratio of said polyalkylene ether glycol to organic diisocyanate being from about 1/1.5 to about 1/2 to prepare an NCO terminated polyether urethane, reacting said polyether urethane with a quantity of a glycol having a molecular weight less than about 500 such that from about 1.8 to 2 equivalents of glycol are present for each NCO group to provide an intermediate having terminal hydroxyl groups, a molecular weight greater than about 1000 and a hydroxyl number of from about 35 to about 120, reacting this intermediate with an excess of from about 20 mol percent to about 300 mol percent of an organic diisocyanate and mixing the NCO terminated polymer thus formed with a chain extending agent containing active hydrogen containing groups in the molecule as determined by the Zerewitinoff test, which groups are reactive with NCO groups, said chain extending agent being present in an amount such that from about 0.3% to about 1% NCO groups are present.

2. A method of making a liquid polyurethane casting composition which comprises reacting a polyalkylene ether glycol having a molecular weight of at least about 750 and an hydroxyl number of from about 40 to about 150 with an organic diisocyanate, the molar ratio of said polyalkylene ether glycol to organic diisocyanate being from about 1/1.5 to about 1/2 to prepare an NCO terminated polyether urethane, reacting said polyether urethane with a quantity of a glycol having a molecular weight less than about 500 such that from about 1.8 to 2 equivalents of glycol are present for each NCO group to provide an intermediate having terminal hydroxyl groups, a molecular weight greater than about 1000 and an hydroxyl number of from about 35 to about 120, reacting this intermediate with an excess of from about 20 mol percent to about 300 mol percent of an organic diisocyanate and mixing the NCO terminated polymer thus formed with a chain extending agent containing active hydrogen containing groups in the molecule as determined by the Zerewitinoff test, which groups are reactive with NCO groups, said chain extending agent being present in an amount such that from about 0.3% to about 1% NCO groups are present.

3. A method of making a liquid polyurethane casting composition which comprises reacting at a temperature of from about 80° C. to about 150° C. a polyalkylene ether glycol, the alkylene portion of which contains from two to four carbon atoms, said polyakylene ether glycol having a molecular weight of at least about 750 and a hydroxyl number of from about 40 to about 150 with an organic diisocyanate, the molar ratio of said polyalkylene ether glycol to organic diisocyanate being from about 1/1.5 to about 1/2 to prepare an NCO terminated polyether urethane, reacting said polyether urethane at a temperature of from about 80° C. to about 150° C. with a quantity of a glycol having a molecular weight less than about 500 such that from about 1.8 to 2 equivalents of glycol are present for each NCO group to provide an intermediate having terminal hydroxyl groups, a molecular weight greater than about 1000 and a hydroxyl number of from about 35 to about 120, reacting this intermediate with an excess of from about 20 mol percent to about 300 mol percent of an organic diisocyanate and mixing the NCO terminated polymer thus formed with a chain extending agent containing active hydrogen containing groups in the molecule as determined by the Zerewitinoff test, which groups are reactive with NCO groups, said chain extending agent being present in an amount such that from about 0.3% to about 1% NCO groups are present.

4. A method of making a liquid polyurethane casting composition which comprises reacting at a temperature of from about 80° C. to about 150° C. a polyalkylene ether glycol having a molecular weight of at least about 750 and an hydroxyl number of from about 40 to about 150 with an organic diisocyanate, the molar ratio of said polyalkylene ether glycol to organic diisocyanate being from about 1/1.5 to about 1/2 to prepare an NCO terminated polyether urethane, reacting said polyether urethane at a temperature of from about 80° C. to about 150° C. with a quantity of a glycol having molecular weight less than about 500 such that from about 1.8 to 2 equivalents of glycol are present for each NCO group to provide an intermediate having terminal hydroxyl groups, a molecular weight greater than about 1000 and an hydroxyl number of from about 35 to about 120, reacting this intermediate with an excess of from about 20 mol percent to about 300 mol percent of an organic diisocyanate and mixing the NCO terminated polymer thus formed with a chain extending agent containing active hydrogen containing groups in the molecule as determined by the Zerewitinoff test, which groups are reactive with NCO groups, said chain extending agent being present in an amount such that from about 0.3% to about 1% NCO groups are present.

5. The process of claim 1 wherein the polyalkylene ether glycol is polypropylene ether glycol.

6. The process of claim 1 wherein the organic diisocyanate is an aromatic diisocyanate.

7. The process of claim 1 wherein the polyalkylene ether glycol is polypropylene ether glycol and the organic diisocyanate is 2,4-toluylene diisocyanate.

8. The liquid polyurethane casting composition prepared by the process of claim 2.

References Cited by the Examiner

UNITED STATES PATENTS

| | | | |
|---|---|---|---|
| 2,871,226 | 1/59 | McShane | 260—77.5 |
| 2,981,719 | 4/60 | Mühlhausen et al. | 260—77.5 |
| 2,900,368 | 8/60 | Stilmar | 260—77.5 |
| 3,054,755 | 9/62 | Windemuth | 260—77.5 |

LEON J. BERCOVITZ, Primary Examiner.

H. N. BURSTEIN, J. R. LIBERMAN, DONALD E. CZAJA, Examiners.